United States Patent
Crane (10) Patent No.: US 11,073,319 B2
(45) Date of Patent: Jul. 27, 2021

(54) CAPACITY CONTROL TECHNIQUE WITH MOTOR TEMPERATURE OVERRIDE

(71) Applicant: Johnson Controls Technology Company, Auburn Hills, MI (US)

(72) Inventor: Curtis Christian Crane, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 111 days.

(21) Appl. No.: 16/234,444

(22) Filed: Dec. 27, 2018

(65) Prior Publication Data

US 2019/0203996 A1    Jul. 4, 2019

Related U.S. Application Data

(60) Provisional application No. 62/611,822, filed on Dec. 29, 2017.

(51) Int. Cl.
*F25B 31/00* (2006.01)
*F25B 49/02* (2006.01)
(Continued)

(52) U.S. Cl.
CPC .......... *F25B 49/022* (2013.01); *F25B 31/006* (2013.01); *F25B 31/008* (2013.01);
(Continued)

(58) Field of Classification Search
CPC .... F25B 49/022; F25B 31/006; F25B 31/008; H02P 29/64; H02K 11/25
See application file for complete search history.

(56) References Cited

U.S. PATENT DOCUMENTS 2,188,350 A    1/1940   Holmes
5,784,232 A    7/1998   Farr
(Continued)

FOREIGN PATENT DOCUMENTS

CN    1653303 A    8/2005
EP    2458728 A2   5/2012
(Continued)

OTHER PUBLICATIONS

Kozaki, Electronic component package and printed wiring board on which electronic component package is mounted, 2014, Full Document (Year: 2014).*

(Continued)

*Primary Examiner* — Edward F Landrum
*Assistant Examiner* — Nael N Babaa
(74) *Attorney, Agent, or Firm* — Fletcher Yoder, P.C.

(57) ABSTRACT

A control system includes processing and memory circuitry, the memory circuitry storing a temperature-based capacity control scheme for a chiller system and the processing circuitry being configured to perform the temperature-based capacity control scheme. The motor temperature-based capacity control scheme is performed as a function of a monitored temperature in a motor configured to drive a compressor of the chiller system, a first temperature threshold corresponding to the monitored temperature, and a second temperature threshold corresponding to the monitored temperature higher than the first temperature threshold.

15 Claims, 8 Drawing Sheets

(51) Int. Cl.
*H02K 7/08* (2006.01)
*H02K 7/09* (2006.01)
*F25B 41/20* (2021.01)
*H02K 11/25* (2016.01)
*H02K 11/35* (2016.01)
*H02P 29/64* (2016.01)

(52) U.S. Cl.
CPC ............ *F25B 41/20* (2021.01); *F25B 49/025* (2013.01); *H02K 7/083* (2013.01); *H02K 7/09* (2013.01); *H02K 11/25* (2016.01); *H02K 11/35* (2016.01); *H02P 29/64* (2016.02); *F25B 2400/05* (2013.01); *F25B 2400/13* (2013.01); *F25B 2600/0253* (2013.01); *F25B 2600/2519* (2013.01); *F25B 2700/21156* (2013.01); *F25B 2700/21157* (2013.01)

(56) References Cited

U.S. PATENT DOCUMENTS

| | | | |
|---|---|---|---|
| 6,041,605 A | 3/2000 | Heinrichs | |
| 6,324,858 B1 | 12/2001 | Holden | |
| 6,434,505 B1 | 8/2002 | Koepke et al. | |
| 6,434,960 B1 | 8/2002 | Rousseau | |
| 6,925,823 B2 | 8/2005 | Lifson et al. | |
| 7,207,186 B2 | 4/2007 | Hirota | |
| 7,633,193 B2 | 12/2009 | Masoudipour et al. | |
| 8,036,853 B2 | 10/2011 | Jayanth et al. | |
| 9,228,590 B2 | 1/2016 | Nachtergaele et al. | |
| 9,739,514 B2 | 8/2017 | Seki et al. | |
| 9,746,227 B2 | 8/2017 | Peng et al. | |
| 2002/0195069 A1* | 12/2002 | Herke | F04D 25/166 123/41.49 |
| 2007/0227168 A1 | 10/2007 | Simmons | |
| 2008/0276636 A1 | 11/2008 | Thybo et al. | |
| 2010/0236264 A1 | 9/2010 | Lifson et al. | |
| 2013/0049507 A1* | 2/2013 | Lang | F16C 32/0412 310/90.5 |
| 2013/0230382 A1 | 9/2013 | De Larminat et al. | |
| 2013/0255932 A1 | 10/2013 | Doepker et al. | |
| 2014/0191695 A1* | 7/2014 | Ganev | H02H 5/04 318/472 |
| 2014/0360210 A1* | 12/2014 | Lapp | F04D 17/10 62/84 |
| 2015/0056059 A1 | 2/2015 | Crane | |
| 2015/0330692 A1* | 11/2015 | Kopko | F25B 1/10 62/115 |
| 2016/0245559 A1* | 8/2016 | Yang | F25B 31/008 |
| 2017/0110930 A1* | 4/2017 | Kozaki | F16C 32/0451 |
| 2017/0218944 A1 | 8/2017 | Schmidt et al. | |

FOREIGN PATENT DOCUMENTS

| | | |
|---|---|---|
| EP | 3055627 A1 | 8/2016 |
| JP | 2015204421 A * | 11/2015 |

OTHER PUBLICATIONS

International Search Report and Written Opinion for PCT Application No. PCT/US2018/067844 dated Mar. 14, 2019, 14 pgs.
Chinese Office Action for CN Application No. 201880089041.9, dated Jun. 3, 2021, 9 pgs.

* cited by examiner

CAPACITY CONTROL TECHNIQUE WITH MOTOR TEMPERATURE OVERRIDE

CROSS-REFERENCE TO RELATED APPLICATION

This application claims priority to and the benefit of U.S. Provisional Application No. 62/611,822, entitled "CAPACITY CONTROL TECHNIQUE WITH MOTOR TEMPERATURE OVERRIDE," filed Dec. 29, 2017, which is hereby incorporated by reference in its entirety for all purposes.

BACKGROUND

This application relates generally to vapor compression systems such as chillers, and more specifically to a compressor of a chiller.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Vapor compression systems (e.g., chillers) utilize a working fluid, typically referred to as a refrigerant, which changes phase between vapor, liquid, and combinations thereof in response to being subjected to different temperatures and pressures associated with operation of the vapor compression system. For example, a heating, ventilation, air conditioning, and refrigeration (HVAC&R) system may include a chiller, which is a type of vapor compression system that cycles a refrigerant to remove heat from, or cool, a flow of water traversing tubes that extend through a chiller evaporator. The chilled water flow may be directed to nearby structures to absorb heat, or provide cooling, before being cycled back to the chiller evaporator to be cooled once again.

Chiller systems utilize compressors, such as centrifugal compressors, to compress the refrigerant as part of a refrigeration cycle, and to motivate the refrigerant through the chiller system. The capacity of the compressor, which generally refers to the amount of refrigerant or fluid being worked upon by the compressor, generally determines the overall capacity of the chiller system (e.g., the ability of the chiller system to generate a cooled fluid). In this way, an increase in fluid flow into the compressor increases the capacity of the chiller system, while a decrease in fluid flow into the compressor decreases the capacity of the chiller system.

Such compressors include a motor which rotates a shaft to operate the compressor. Operation of the motor generates heat within the motor, which, if uncontrolled, can degrade the performance of the motor over time. Indeed, in certain situations, once a certain temperature of the motor is reached, a fault condition is indicated in a control system of the chiller, which causes the chiller to shutdown to allow the motor to return to an acceptable operating temperature.

A centrifugal compressor may encounter instabilities such as surge or stall during operation. Surge or surging is a transient phenomenon having oscillations in pressures and flow, and can result in complete flow reversal through the compressor. Surging, if uncontrolled, can cause excessive vibrations in both the rotating and stationary components of the compressor, and may result in permanent compressor damage. One technique to correct a surge condition can involve the opening of a hot gas bypass valve to return some of the discharge gas of the compressor to the compressor inlet to increase the flow at the compressor inlet. In contrast, stall or rotating stall is a local flow separation in one or more components of a compressor, and can have discharge pressure disturbances at fundamental frequencies less than the rotational frequency of the impeller of the compressor. Rotating stall in a fixed speed centrifugal compressor is predominantly located in the diffuser of the compressor and can be remediated with a variable geometry diffuser (VGD). The presence of rotating stall in the compressor can be a precursor of an impending surge condition.

In many control systems, capacity control, surge/stall control, and motor temperature control may be in conflict with each other. For example, the capacity control may prescribe compressor operating conditions that can cause a surge or stall condition to occur, and/or which can cause motor temperatures to rise beyond an acceptable operating temperature. Similarly, the surge/stall control and motor temperature control may not provide the desired output capacity of the capacity control.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

An embodiment includes a chiller system having a compressor of a refrigeration circuit having the compressor, a condenser, and an evaporator in fluid communication. The chiller system also includes a motor configured to drive the compressor. The motor is fluidly coupled to the condenser to allow the motor to receive refrigerant from the condenser to cool the motor. A motor cooling valve is positioned fluidly between the motor and the condenser, and the motor cooling valve is electronically adjustable continuously between a fully open position and a fully closed position to regulate the amount of refrigerant introduced into the motor between full refrigerant flow and no refrigerant flow, respectively. The chiller system also includes a capacity control system configured to control loading or unloading of the chiller system according to a motor temperature-based capacity control scheme performed in response to determining that the motor cooling valve is in the fully open position. The motor temperature-based capacity control scheme is performed as a function of a monitored temperature associated with the motor, a first temperature threshold corresponding to the monitored temperature, and a second temperature threshold corresponding to the monitored temperature higher than the first temperature threshold.

Another embodiment includes a method of performing capacity control in a chiller system. The method includes driving a compressor of the chiller system using a motor, cooling the motor using refrigerant supplied from a refrigeration circuit of the chiller system, the refrigeration circuit having the compressor, a condenser, and an evaporator in fluid communication; controlling an amount of refrigerant provided to the motor for cooling using a motor cooling valve positioned fluidly between the motor and the condenser, wherein the motor cooling valve is electronically adjustable continuously between a fully open position and a fully closed position to regulate the amount of refrigerant introduced into the motor between full refrigerant flow and no refrigerant flow, respectively; and controlling loading or unloading of the chiller system using a capacity control system according to a motor temperature-based capacity control scheme performed in response to determining that the motor cooling valve is in the fully open position, wherein the motor temperature-based capacity control scheme is performed as a function of a monitored temperature associated with the motor, a first temperature threshold corresponding to the monitored temperature, and a second temperature threshold corresponding to the monitored temperature higher than the first temperature threshold.

Another embodiment includes a control system includes processing and memory circuitry, the memory circuitry storing a temperature-based capacity control scheme for a chiller system and the processing circuitry being configured to perform the temperature-based capacity control scheme. The motor temperature-based capacity control scheme is performed as a function of a monitored temperature in a motor configured to drive a compressor of the chiller system, a first temperature threshold corresponding to the monitored temperature, and a second temperature threshold corresponding to the monitored temperature higher than the first temperature threshold.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, chiller compressors include a motor which rotates a shaft to operate the compressor. Operation of the motor generates heat within the motor, which, if uncontrolled, can degrade the performance of the motor over time. Further, the throughput of the compressor generally establishes the overall capacity of the chiller system, where increasing the capacity may be referred to as "loading" of the system, while reducing the capacity may be referred to as "unloading" of the system.

Certain control schemes of the present disclosure may include a capacity control scheme that causes load limiting and unloading of the chiller system as a monitored motor temperature increases. Such capacity control may be performed using, for example, PID control to satisfy a cooling load. An example of a capacity cooling control scheme is set forth in U.S. Patent Application Publication No. 2015/0056059, which is incorporated herein by reference in its entirety for all purposes.

Certain control schemes of the present disclosure use a capacity control scheme while certain temperature conditions in the motor are within a normal operating range. However, in situations where the certain temperature conditions within the motor are such that a motor cooling valve is fully open, the capacity control is partially or fully overridden to enable sufficient cooling of the motor to avoid chiller shutdown. Whether the capacity control is partially or fully overridden may depend on certain temperatures of the motor. In this way, the control schemes of the present disclosure include a variety of operating regimes that depend on, among other parameters, certain monitored temperatures of the motor. By way of non-limiting example, these monitored temperatures may include a motor winding temperature, a motor bearing temperature, and/or a motor bearing controller (MBC) heatsink temperature.

The control techniques of the present disclosure may be used in a variety of systems. However, to facilitate discussion, examples of systems that may incorporate the control techniques of the present disclosure are depicted in FIGS. 1-4, which are described hereinbelow.

Figure 1:
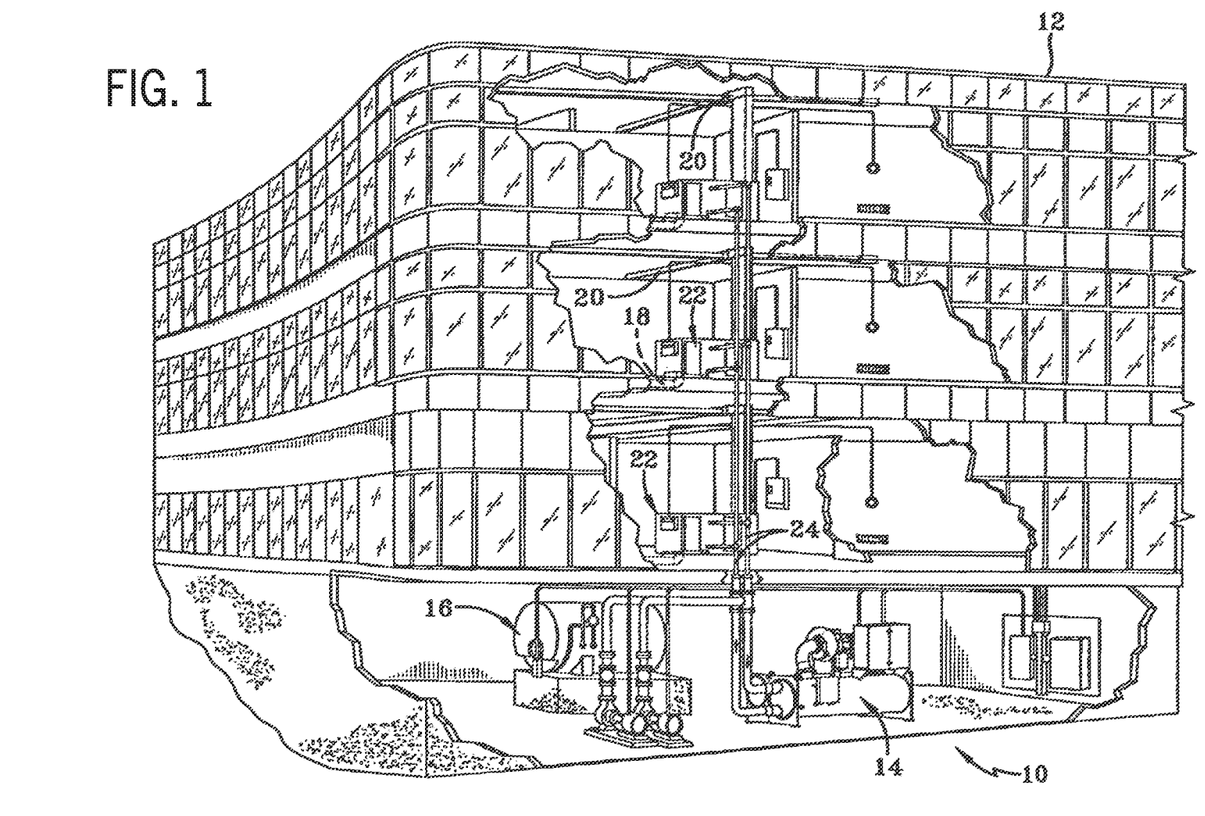
FIG. 1 is a perspective view of a building that may utilize an embodiment of a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, and air conditioning (HVAC) system 10 in a building 12 for a typical commercial setting. The HVAC system 10 may include a vapor compression system 14 that supplies a chilled liquid, which may be used to cool the building 12. The HVAC system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC system 10. The HVAC system 10 is shown with a separate air handler on each floor of building 12, but in other embodiments, the HVAC system 10 may include air handlers 22 and/or other components that may be shared between or among floors.

Figure 2:
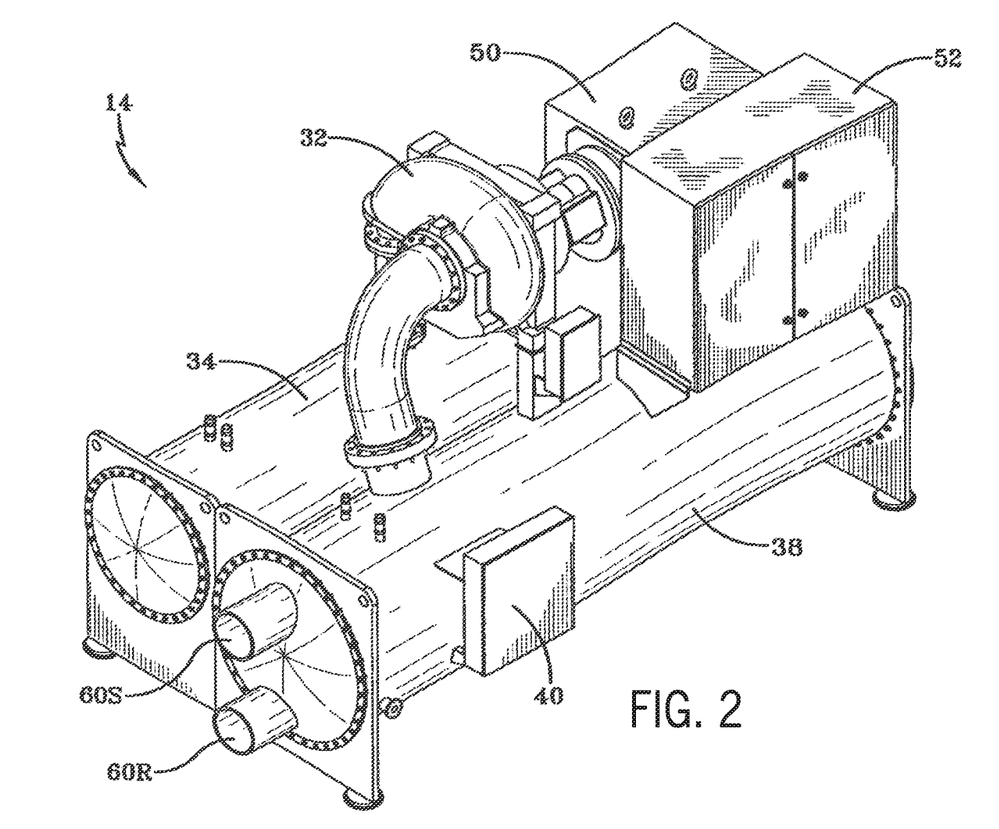
FIG. 2 is a perspective view of an embodiment of a vapor compression system, in accordance with an aspect of the present disclosure.
Figure 3:
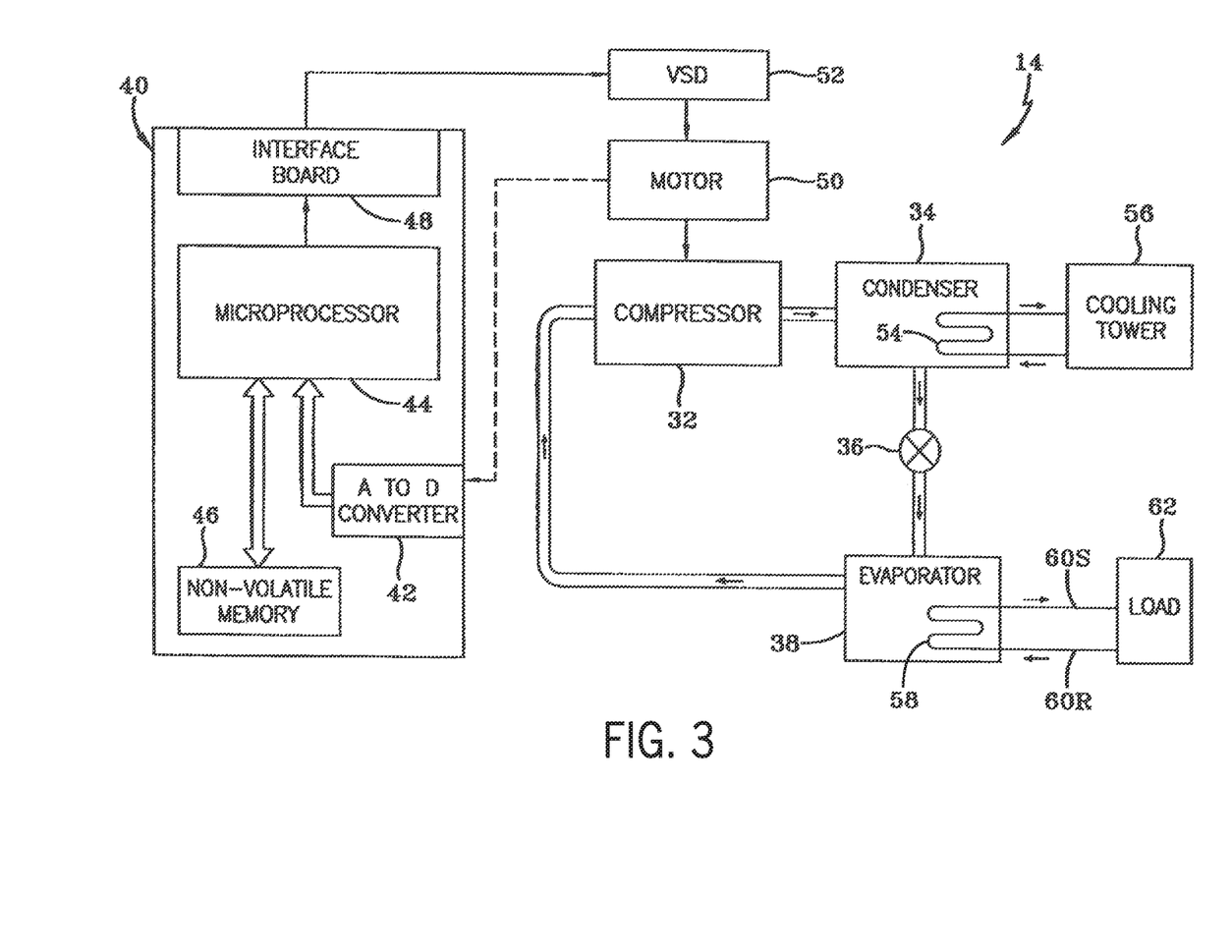
FIG. 3 is a schematic illustration of an embodiment of the vapor compression system of FIG. 2, in accordance with an aspect of the present disclosure.

FIGS. 2 and 3 are embodiments of the vapor compression system 14 that can be used in the HVAC system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 (e.g., controller) that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro-olefin (HFO), "natural" refrigerants like ammonia (NH3), R-717, carbon dioxide (CO2), R-744, or hydrocarbon based refrigerants, water vapor, refrigerants with low global warming potential (GWP), or any other suitable refrigerant. In some embodiments, the vapor compression system 14 may be configured to efficiently utilize refrigerants having a normal boiling point of about 19 degrees Celsius (66 degrees Fahrenheit or less) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The refrigerant liquid from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The refrigerant liquid delivered to the evaporator 38 may absorb heat from another cooling fluid, which may or may not be the same cooling fluid used in the condenser 34. The refrigerant liquid in the evaporator 38 may undergo a phase change from the refrigerant liquid to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the refrigerant vapor exits the evaporator 38 and returns to the compressor 32 by a suction line to complete the cycle.

Figure 4:
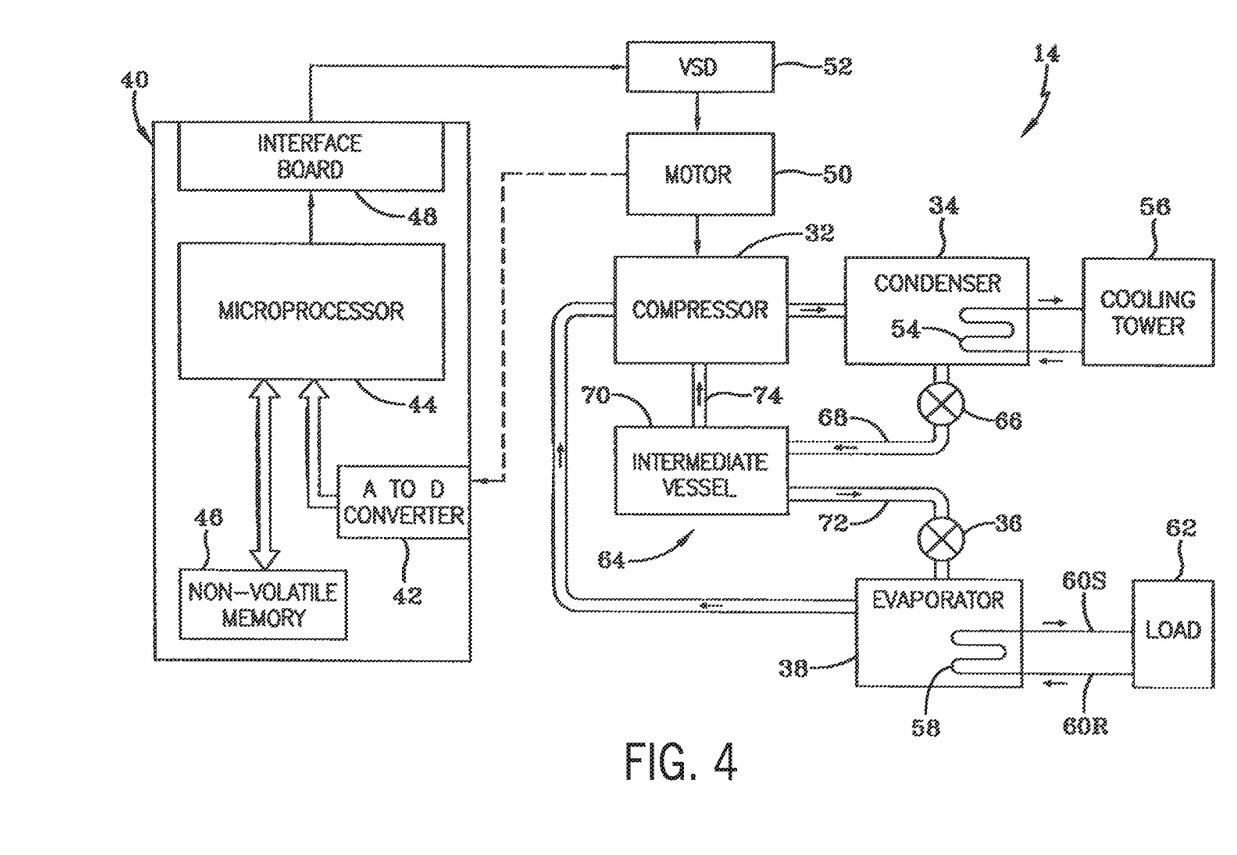
FIG. 4 is a schematic illustration of another embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the refrigerant liquid received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the refrigerant liquid because of a pressure drop experienced by the refrigerant liquid when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the refrigerant liquid exiting the condenser 34 because of the expansion in the expansion device 66 and/or the intermediate vessel 70. The liquid from intermediate vessel 70 may then flow in line 72 through a second expansion device 36 to the evaporator 38.

Figure 5:
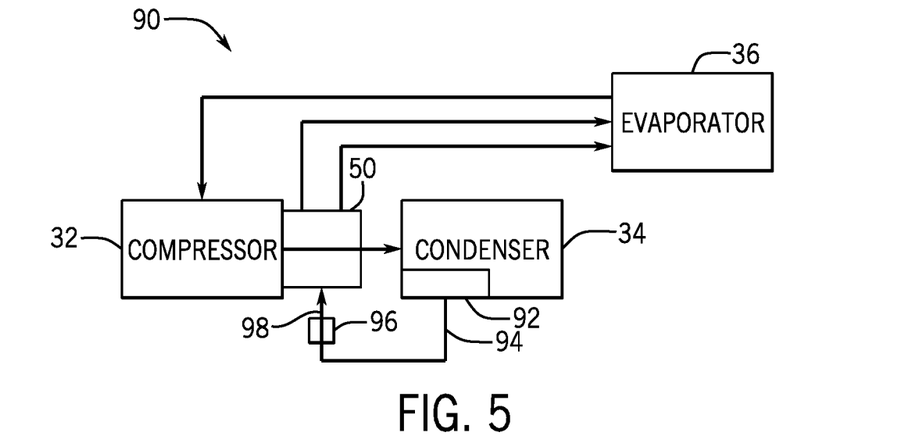
FIG. 5 is a schematic illustration of an embodiment of a cooling system configured to cool a compressor motor of the vapor compression system of FIGS. 1-4, in accordance with an aspect of the present disclosure.

As set forth above, the motor 50 used in the vapor compression system 14 of FIGS. 1-4 may generate heat during operation and, accordingly, is generally cooled using refrigerant provided from the condenser 34. Specifically, introduction of the refrigerant into the motor 50 is regulated according to the motor cooling techniques of the present disclosure. To help illustrate, FIG. 5 schematically depicts an example of the manner in which the motor 50 may be cooled using refrigerant from the condenser 34. Specifically, FIG. 5 depicts a cooling system 90 that circulates refrigerant to the motor 50 to cool the motor 50. It should be noted that portions of the vapor compression system 14 are not shown for clarity.

As set forth above, the compressor 32 compresses the refrigerant (which generally enters as a gas), raising the temperature of the refrigerant gas as it is compressed. The pressurized, high temperature refrigerant gas then flows to the condenser 34 where the high pressure refrigerant gas is condensed to a high pressure liquid 92. A portion 94 of the refrigerant liquid from the condenser 34 is routed through a third expansion device 96 (e.g., an electronic expansion valve), referred to herein as a motor cooling valve 96, where the liquid refrigerant is converted into a low temperature mist 98. The refrigerant mist 98 then is sent to the motor 50, where it is used to cool the motor 50. Specifically, the liquid portion of the refrigerant mist 98 draws heat from the motor 50 as it evaporates, undergoing a phase change. Liquid refrigerant that is not evaporated is sent from the motor back to evaporator 36 where it evaporates. Refrigerant gas from the motor 50 may be returned to the refrigeration circuit at any point from the evaporator 36 to the gas refrigerant inlet of the compressor 32. In FIG. 5, refrigerant gas and refrigerant liquid from the motor 50 are shown as being returned to the evaporator 36 via separate lines, but other arrangements may be used (e.g., combined flow of the refrigerant phases, flows directed to other parts of the circuit).

Figure 6:
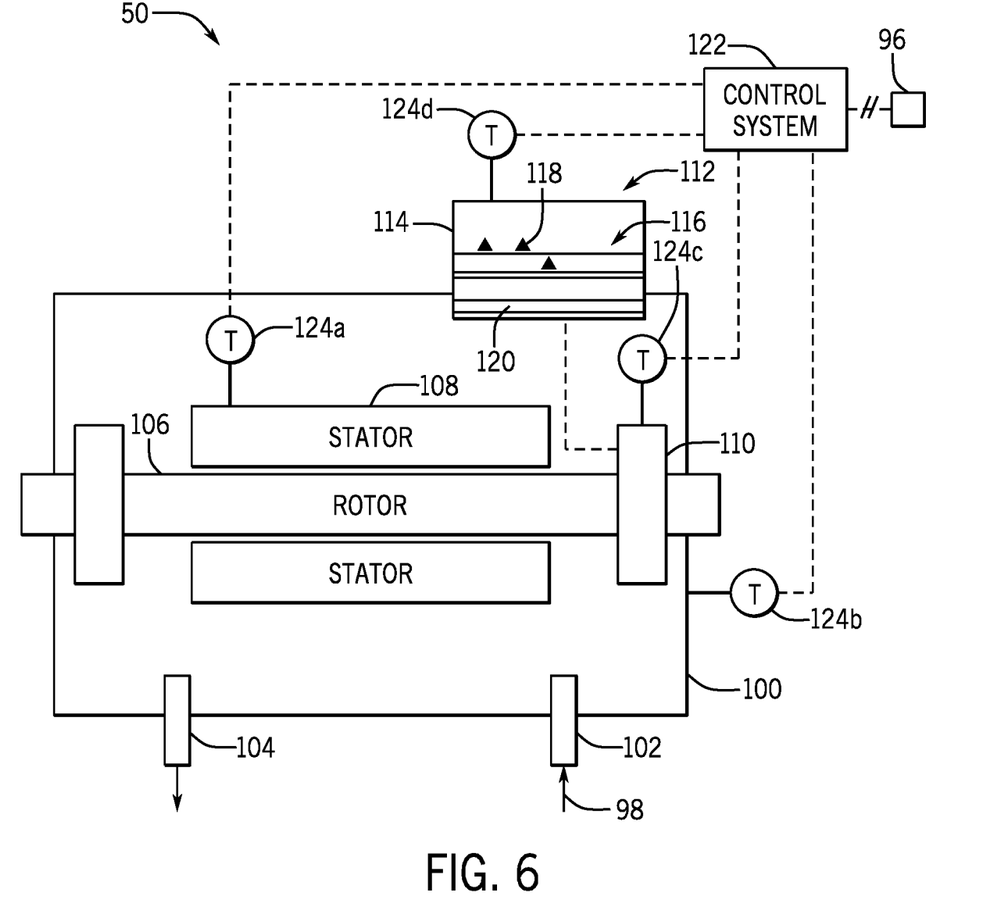
FIG. 6 is a schematic illustration of an embodiment of the compressor motor of FIGS. 1-5 having a plurality of temperature sensors that provide temperature feedback to a motor temperature control system, in accordance with an aspect of the present disclosure.

A schematic representation of the motor 50 is shown in FIG. 6. As illustrated, the motor 50 includes a housing 100 having a refrigerant inlet 102 and a refrigerant outlet 104. The refrigerant inlet 102 is fluidly coupled to the motor cooling valve 96 of FIG. 5, and allows the refrigerant mist 98 to be introduced into the housing 100 of the motor 50 to cool various internal components. Specifically, the refrigerant mist 98 is circulated within the housing 100 to cool the various motor components, and the refrigerant gas and/or refrigerant liquid is directed out of the housing 100 via the refrigerant outlet 104. While only one refrigerant inlet 102 and one refrigerant outlet 104 are illustrated, in certain embodiments there may be a plurality (two or more) of the refrigerant inlet 102 and refrigerant outlet 104 (e.g., to direct refrigerant to specific parts of the motor 50 and/or to collect refrigerant from different portions of the motor 50).

The motor 50 includes a variety of components, only some of which are shown in FIG. 6. The components include, among other things, a rotor 106 positioned within a stator 108. The stator 108 generally includes stator windings, such as copper windings around a ferromagnetic core material (e.g., laminated steel). The rotor 106 is configured to attach to the compressor 32, and drives the shaft of the compressor 32 during operation.

Electromagnetic (EM) bearings 110 support the rotor 106 within the motor 50 using a magnetic field. In certain embodiments, the motor 50 may also include mechanical bearings as a backup to the EM bearings 110. In other embodiments, the bearings 110 may be oil-lubricated bearings, such as journal bearings, or anti-friction bearings (e.g., ball or roller bearings). In still further embodiments, the bearings 110 may include refrigerant-lubricated bearings. Operational parameters of the EM bearings 110 are monitored and controlled by a magnetic bearing controller (MBC) 112, which is partially or fully disposed within the housing 100, or in other embodiments may be disposed outside of the housing 100, or entirely away from the housing 100. The illustrated MBC 112 includes an enclosure 114 that is mounted to the motor housing 50. The enclosure 114 houses one or more circuit boards 116 to which various electronic components 118 may be mounted (e.g., processors, memory). The electronic components may be configured to monitor and control operational parameters of the EM bearings 110, among other things.

During operation of the motor 50, the electronic components 118 generate heat, which is removed to prevent damage to the components. Generally, heat is conducted away from the electronic components 118 via the enclosure 114, which may be a heat sink for the MBC 112. In certain embodiments, the MBC 112 may include a heat sink layer 120 to provide for additional thermal conduction away from the circuit boards 116 and the electronic components 118.

To facilitate temperature control of the motor 50, a motor temperature control system 122 may be associated with the motor 50. As an example, the motor temperature control system may include one or more proportional-integral-derivative (PID) controllers. The one or more PID controllers may be implemented as standalone control devices, or as hardware and/or software modules associated with the control panel 40. The control system 122 is communicatively coupled to at least the motor cooling valve 96, as well as a plurality of temperature sensors 124 (e.g., thermocouples, thermistors) associated with any one or a combination of the various components of the motor 50. The temperature sensors 124 provide temperature feedback to the motor temperature control system 122. For instance, in the illustrated embodiment, the temperature sensors 124 include a stator winding temperature sensor 124a that provides stator winding temperature feedback, a motor housing temperature sensor 124b that provides motor housing temperature feedback, a bearing temperature sensor 124c that provides bearing temperature feedback, and a MBC heatsink temperature sensor 124d that provides MBC heatsink temperature feedback. The motor temperature control system 122 may use any one or a combination of this feedback to control operation (e.g., opening and closing) of the motor cooling valve 96.

As may be appreciated, opening of the motor cooling valve 96 may increase the amount of refrigerant mist 98 introduced into the motor 50 to effect cooling of the motor components. Conversely, closing the motor cooling valve 96 reduces the amount of refrigerant mist 98 introduced into the motor 50, which may reduce the cooling rate of the motor components or may allow them to warm, depending on operating conditions. In accordance with present embodiments, a capacity control scheme may be used to control loading and unloading of the vapor compression system 14, depending on, among other things, the temperature feedback provided by the temperature sensors 124.

Figure 7:
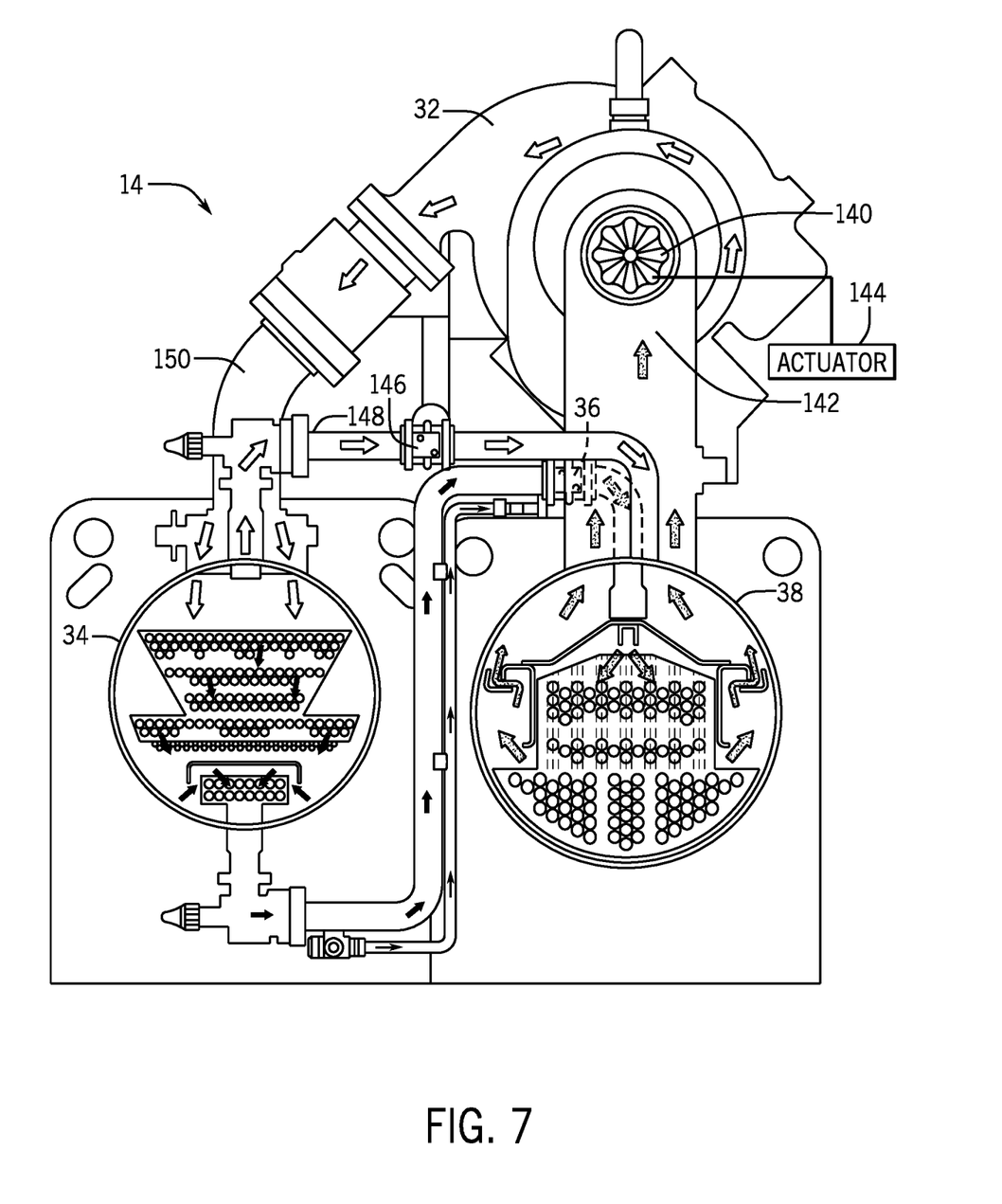
FIG. 7 is an elevation view of an embodiment of the vapor compression system of FIG. 1, in accordance with an aspect of the present disclosure.

The capacity of the compressor 32 may be controlled using various features associated with the compressor 32. FIG. 7 is an elevational view of an example embodiment of the vapor compression system 14, and depicts certain devices configured to allow capacity control of the compressor 32. As shown, the compressor 32 includes pre-rotation vanes 140. The pre-rotation vanes (PRVs) 140 may be fixed into a predetermined position or may have a position that is adjustable. The PRVs 140 (or inlet guide vanes) are located at an inlet of the compressor 32, for example along a suction line 142 extending between the evaporator 38 and the compressor 32, and are adjustable to control the flow of refrigerant into the compressor 32. An actuator 144 can be used to open the PRVs 140 to increase the amount of refrigerant or fluid to the compressor 32 and thereby increase the capacity of the system 14. Similarly, the actuator 144 can be used to close the PRVs 140 to decrease the amount of refrigerant or fluid to the compressor 32 and thereby decrease the capacity of the system 14.

The illustrated vapor compression system 14 also includes a hot gas bypass valve (HGBV) 146 positioned along a bypass line 148 extending between a discharge passage 150 of the compressor 32 and the suction line 142 of the compressor 32. Opening of the HGBV 146 allows a portion of the compressed refrigerant or fluid back to the suction inlet 142 of the compressor 32.

Capacity control may also be performed by adjusting the speed of the compressor 32 in addition to or as an alternative to using the PRVs 140 and/or the HGBV 146. For example, the VSD 52 may adjust the speed of the compressor 32 via the rotational rate of the rotor 106 of the motor 50.

Figure 8:
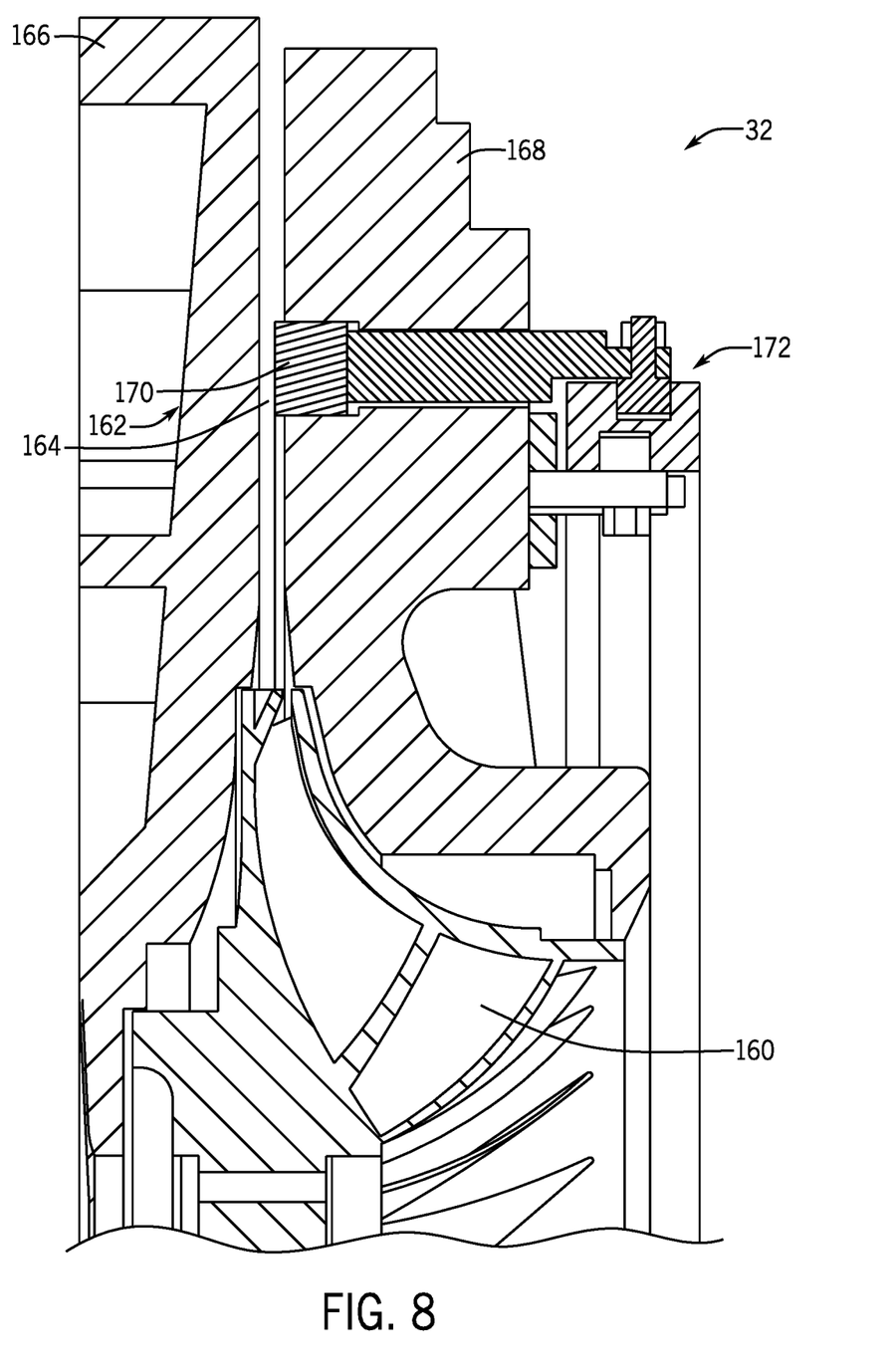
FIG. 8 is a cross-sectional view of an embodiment of the compressor of FIGS. 2-4 and 7, in accordance with an aspect of the present disclosure.

Certain internal features of the compressor 32 may also be used to control the capacity of the system. FIG. 8 is a partial cross-sectional view of an example embodiment of the compressor 32. The illustrated compressor 32 includes an impeller 160 for compressing the refrigerant vapor. The compressed vapor from impeller 160 then passes through a variable geometry diffuser (VGD) 162. The VGD 162 has a diffuser space or gap 164 formed between a diffuser plate 166 and a nozzle base plate 168 for the passage of the refrigerant vapor. The nozzle base plate 168 is configured for use with a diffuser ring 170. The diffuser ring 170 is configured to control the velocity of refrigerant vapor that passes through the diffuser space or gap 164. The diffuser ring 170 is capable of being extended into the diffuser gap 164 to increase the velocity of the vapor flowing through diffuser gap 164 and can be retracted from the diffuser gap 164 to decrease the velocity of the vapor flowing through the diffuser gap 164. Extension and retraction of the diffuser ring 170 may be performed using an adjustment mechanism 172, driven by an actuator.

The VGD 162 can be adjusted to any position between a substantially open or retracted position, wherein refrigerant flow is substantially unimpeded in diffuser gap 164, and a substantially closed or extended position, wherein refrigerant flow in diffuser gap 164 is restricted. In one embodiment, The VGD 162, when in the closed position, may not completely stop the flow of refrigerant in diffuser gap 164. The adjustment mechanism 172 can move the diffuser ring 170 either continuously, or incrementally in discrete steps to open and close the diffuser gap 164.

If the compressor 32 has more than one compression stage, the VGD 162 may be incorporated in the discharge passage of one or more of the compression stages. In another embodiment, more than one VGD 162 may be positioned in diffuser gap 164 to control the flow of refrigerant from the impeller 160, and thereby control the capacity of compressor 32. In a further embodiment, the positioning of diffuser ring 170 can decrease or eliminate surge conditions and stall conditions in compressor 32.

To provide for motor cooling control, capacity control, and other control processes of the present disclosure, in the control panel 40 of FIG. 4, the A/D converter 42 and/or the interface board 48 may receive input signals from system sensors and components that provide operational parameters for the vapor compression system 14. For example, the input signals received by the control panel 40 can include the temperature of the leaving chilled liquid temperature from tube bundle 54, refrigerant pressures in the evaporator 38 and the condenser 34, the input current to the VSD 52, the output current from the VSD 52, a compressor discharge temperature, a compressor oil temperature, a compressor oil supply pressure, a VGD position, an HGBV position and an acoustic or sound pressure in the compressor discharge passage 150, a temperature of the bearing 110 itself, lubricant temperature after leaving the bearing 110, and so forth. The control panel 40 may use interface board 48 to transmit signals to components of the vapor compression system 14 to control the operation of vapor compression system 14 (e.g., closing and opening of the motor cooling valve 96, the position of the PRVs 140, movement of the VGD 162 and the diffuser ring 170, the position of the HGBV 164, and so forth and to communicate with various sensors and control devices of vapor compression system 14.

The control panel 40 may execute or use a single or central control algorithm or control system to control the operation of vapor compression system 14 including the components set forth above, among others. Indeed, the control algorithms, control systems, control modules, and so forth, of the present disclosure may be implemented as computer programs or software stored in the non-volatile memory 46 having a series of instructions executable by the microprocessor 44. While the control algorithm may be embodied in a computer programs and executed by microprocessor 44, in other embodiments the control algorithm may be implemented and executed using digital and/or analog hardware. Further, the control panel 40 may incorporate multiple controllers (e.g., PID controllers), each performing a discrete function, with a central controller that determines the outputs of control panel 40.

In this respect, the central control algorithm executed by microprocessor 44 on the control panel 40 includes a capacity control program or algorithm to control the capacity of the compressor 32 to satisfy a cooling load, while also performing a motor temperature control algorithm to avoid potential chiller shutdown conditions. The capacity control program can send or transmit control signals to adjust the capacity of the compressor 32 by adjusting the position of the VGD 162, the speed of VSD 52 (and thereby the speed of the motor 50), and the position of the HGBV 146 in a specific sequence depending on whether loading or unloading of the compressor 32 is appropriate to keep a leaving chilled liquid temperature (LCHLT) at a preselected setpoint. The VSD 52 and motor speed can be additionally and simultaneously adjusted as appropriate to maintain the minimum compressor lift suitable to prevent surge as a function of existing compressor speed, VGD position and condenser to evaporator pressure difference. In certain embodiments, the position of the PRVs 140 may be adjusted as part of the sequence noted above.

In addition, the capacity control program of the present disclosure includes limit and override thresholds that correspond to certain monitored motor temperatures to mitigate possible unstable conditions to keep the system operational, e.g., avoid a system shut down. The limits and overrides can limit or reduce the output to the appropriate devices (e.g., the PRVs 140, the HGBV 146, the VGD 162, and/or the VSD 52) to mitigate the condition and keep the system operational. As any of the limit and override thresholds are approached, the capacity control program may proportionally limit the amount of capacity increase permitted and if exceeded, can issue unloading instructions.

Figure 9:
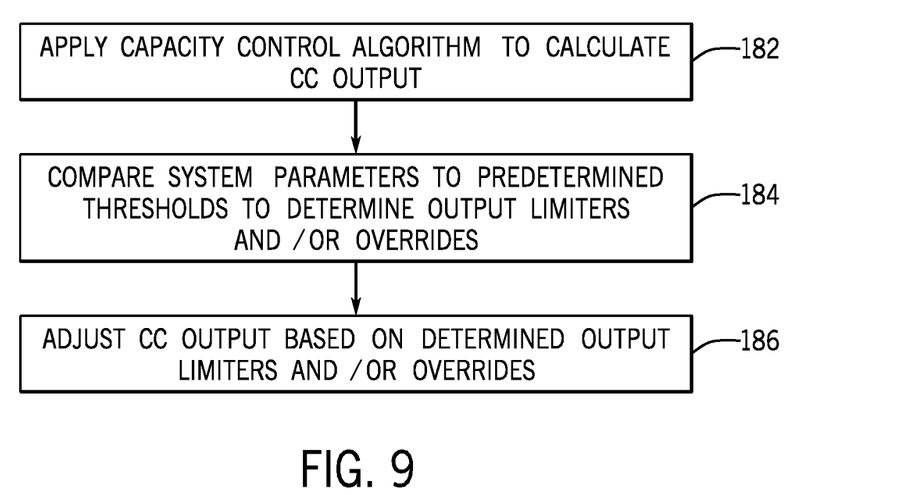
FIG. 9 is a process flow diagram illustrating an embodiment of a capacity control process that includes limits and overrides, in accordance with an aspect of the present disclosure.

FIG. 9 is a process flow diagram illustrating an embodiment of a capacity control process 180 performed in accordance with the present disclosure. The process 180 includes initiating or applying a capacity control algorithm to determine a capacity control output (CC Output) parameter (operation 182). For example, the capacity control algorithm may apply or initiate a leaving chilled liquid temperature (LCHLT) Proportional, Integral, Derivative (PID) controller or control algorithm immediately upon entering the run state, i.e., at the start of the compressor. During each control cycle, the capacity control algorithm may use PID logic to determine a desired percent change to system capacity, i.e., the CC Output, based on the LCHLT compared to the LCHLT active setpoint. The desired percent change may be positive for loading or negative for unloading.

The LCHLT active setpoint is a target to the LCHLT programmed setpoint, depending on the control source selected, e.g., a local user interface, a remote user interface or a building automation system (BAS) or ISN control. When the system is not operating, the LCHLT active setpoint may, for example, be set to the entering chilled liquid temperature −10° F. When the VSD 52 starts, the LCHLT active setpoint is ramped to the LCHLT programmed setpoint at the programmable LCHLT setpoint ramp rate. When the capacity control program is operating, any change to the programmed LCHLT setpoint results in a ramp from the old active setpoint value to the new LCHLT setpoint value at the programmed LCHLT setpoint ramp rate.

The process includes comparing measured system parameters to predetermined thresholds to determine output limiters and/or overrides (operation 184). The system parameters with output limiters and overrides may include high condenser pressure limit and override, low evaporator pressure limit and override, motor current limit and override, and input current to the VSD limit and override. In accordance with the present disclosure, the system parameters include a monitored motor temperature series of limits and overrides. An example of such a scheme is described herein with respect to FIG. 10.

In the process 180, if one or more of the measured parameters are within the load limiting region or the override region, then an adjustment is made to the CC Output based on the determined output limiters and/or overrides (operation 186). In one embodiment, the CC Output can be adjusted to an increase of the minimum of the calculated capacity change from the LCHLT PID and each of the load limiter and override values that was determined. Similarly, the CC Output can be adjusted to a decrease of the maximum of the calculated capacity change from the LCHLT PID and each of the load limiter and override values that was determined. Outputs may then be sent to the appropriate devices described above, in any suitable sequence, to effect capacity change in accordance with the determined adjusted CC output.

In accordance with present embodiments, a desired capacity change can be implemented by applying the calculated output change (CC Output) to each device according to a predetermined sequence so the summation of the changes to each device equals the full change desired. If the full magnitude of a change cannot be applied to a specific device due to a limit, the remainder of the change is applied to the other devices in order. Each device may have an associated operating gain (selectable as its output gain setpoint) that relates a desired percent change in capacity to the device's response in percent position or Hertz. The magnitude of change can be determined for each of the devices according to their individual output gains.

Figure 10:
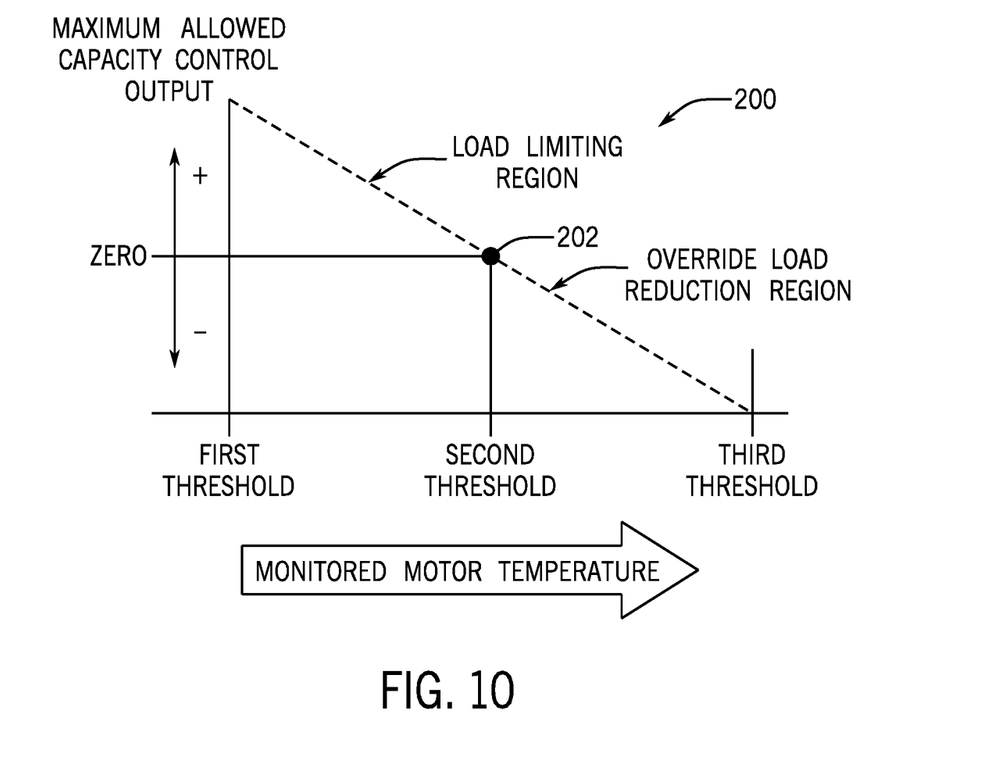
FIG. 10 is a graphical illustration of a motor temperature-based capacity control scheme having a load limiting region and an override region performed as a function of a monitored motor temperature, in accordance with an aspect of the present disclosure.

FIG. 10 is a graphical depiction of a motor temperature-based capacity control scheme 200 which may be initiated upon receipt of an indication that the motor cooling valve 96 is in a fully open position. This may signal to the control panel 40 that the motor 50 is experiencing high operating temperatures and, accordingly, operation of the vapor compression system 14 may need to be adjusted to avoid a chiller shutdown fault condition as a result of motor temperature, and to prevent possible damage of the motor 50.

The motor temperature-based capacity control scheme 200 is performed according to a monitored motor temperature, which may be temperature readings from the stator winding temperature sensor 124*a* that provides stator winding temperature feedback, the motor housing temperature sensor 124*b* that provides motor housing temperature feedback, the bearing temperature sensor 124*c* that provides bearing temperature feedback (e.g., of the bearing itself and/or of a bearing lubricant), or the MBC heatsink temperature sensor 124*d* that provides MBC heatsink temperature feedback. For example, the temperature-based capacity control scheme 200 may be dependent upon the highest measured temperature of the stator windings. In another embodiment, the average highest temperature may be used for the control scheme 200. In other embodiments, the control scheme 200 may be dependent upon the bearing temperature, such as a specific bearing temperature, the highest bearing temperature based on a series of temperature readings, or an average bearing temperature. In still further embodiments, the control scheme 200 may be based on a specific MBC temperature, a highest MBC temperature from a series of MBC temperature readings, or an average MBC temperature.

The graph in FIG. 10 shows for an increasing motor temperature reading (stator winding temperature, or bearing temperature, or MBC temperature), a load limiting region between a first threshold and a second threshold, and an override region between the second threshold and a third threshold (e.g., the chiller shutdown fault temperature). The control scheme 200 also includes a transition point 202 at the second threshold, where no loading is allowed (e.g., a no load command override is initiated).

In accordance with the control scheme 200, maximum capacity control output is allowed at and below the first threshold. In other words, at temperatures below the first threshold, the capacity control is in full command with no gain or other limiting being applied, as the output is not affected by motor cooling concerns. In response to determining that the measured temperature is in the load limiting region, the capacity control program can still increase the capacity of the system, but the amount or percentage of the increase is proportionally limited.

In response to determining that the monitored temperature is in the override region, the capacity control program is forced to decrease the capacity of the system even if the capacity control program requires an increase in capacity. The amount or percentage of the decrease is proportional to the amount by which the second threshold is exceeded. Further, if the capacity control algorithm requires more unloading than the override, the output generated by the capacity control algorithm is used for unloading. In the override region, the minimum of the capacity control, motor cooling control and all overrides is used to command the loading and unloading of the chiller. With regard to the percentage or amount of system capacity increase or decrease, positive numbers reflect a request for increasing capacity and negative numbers reflect a request for decreasing capacity.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A chiller system,. comprising:
   a compressor of a refrigeration circuit having the compressor, a condenser, and an evaporator in fluid communication;
   a motor configured to drive the compressor, wherein the motor is fluidly coupled to the condenser to allow the motor to receive refrigerant from the condenser to cool the motor;
   a motor cooling valve positioned fluidly between the motor and the condenser, wherein the motor cooling valve is electronically adjustable continuously between a fully open position and a fully closed position to regulate an amount of refrigerant introduced into the motor between full refrigerant flow and no refrigerant flow, respectively; and
   a capacity control system configured to control loading or unloading of the chiller system according to a motor temperature-based capacity control scheme performed in response to determining that the motor cooling valve is in the fully open position, wherein the motor temperature-based capacity control scheme is performed as a function of a monitored temperature associated with the motor, a first temperature threshold corresponding to the monitored temperature, and a second temperature threshold corresponding to the monitored temperature higher than the first temperature threshold, and wherein the motor temperature-based capacity control scheme comprises:
      a load limiting region corresponding to a temperature range between the first temperature threshold and the second temperature threshold, wherein the load limiting region is configured to proportionally limit loading of the chiller system based on an amount by which the monitored temperature has exceeded the first temperature threshold; or
      an override region associated with a temperature range above the second temperature threshold and below a chiller shutdown temperature, wherein the override region is configured to proportionally unload the chiller system based on an amount by which the monitored temperature has exceeded the second temperature threshold; or both.

2. The chiller system of claim 1, wherein the motor temperature-based capacity control scheme comprises a no load command override associated with the second temperature threshold, wherein the no load command override does not allow a load command to be provided to components configured to allow loading of the compressor.

3. The chiller system of claim 1, wherein,. if the capacity control system requires a higher level of unloading than provided by proportional unload in the override region, a capacity control unload level is used.

4. The chiller system of claim 1, wherein the motor comprises a housing, a rotor positioned within a stator having stator windings, electromagnetic (EM) bearings configured to support the rotor, and a magnetic bearing controller (MBC) configured to regulate operation of the EM bearings, the MBC having a heat sink, and wherein the monitored temperature is a stator winding temperature, an EM bearing temperature, or a MBC temperature.

5. The chiller system of claim 1, wherein the motor comprises a housing, a rotor positioned within a stator having stator windings, and lubricated bearings configured to support the rotor, and wherein the monitored temperature is a temperature of one or more of the lubricated bearings or of a lubricant of the lubricated bearings.

6. The chiller system of claim 5, wherein the lubricated bearings comprise refrigerant-lubricated bearings.

7. A method of performing capacity control in a chiller system, the method comprising:
   driving a compressor of the chiller system using a motor;
   cooling the motor using refrigerant supplied from a refrigeration circuit of the chiller system, the refrigeration circuit having the compressor, a condenser, and an evaporator in fluid communication;
   controlling an amount of the refrigerant provided to the motor for cooling using a motor cooling valve positioned fluidly between the motor and the condenser, wherein the motor cooling valve is electronically adjustable continuously between a fully open position and a fully closed position to regulate the amount of the refrigerant introduced into the motor between full refrigerant flow and no refrigerant flow, respectively; and
   controlling loading or unloading of the chiller system using a capacity control system according to a motor temperature-based capacity control scheme performed in response to determining that the motor cooling valve is in the fully open position, wherein the motor temperature-based capacity control scheme is performed as a function of a monitored temperature associated with the motor, a first temperature threshold corresponding to the monitored temperature, and a second temperature threshold corresponding to the monitored temperature higher than the first temperature threshold, wherein controlling the loading or unloading of the chiller system comprises:
      proportionally limiting loading of the chiller system based on an amount by which the monitored temperature has exceeded the first temperature threshold in response to determining that the monitored temperature is within a temperature range between the first temperature threshold and the second temperature threshold; or
      proportionally unloading the chiller system based on an amount by which the monitored temperature has exceeded the second temperature threshold in response to determining that the monitored temperature is within a temperature range between the second temperature threshold and a chiller shutdown temperature; or both.

8. The method of claim 7, comprising preventing a load command from being provided to components configured to load the chiller system in response to determining that the monitored temperature has reached the second temperature threshold.

9. The method of claim 7, wherein the motor comprises a housing, a rotor positioned within a stator having stator windings, electromagnetic (EM) bearings configured to support the rotor, and a magnetic bearing controller (MBC) configured to regulate operation of the EM bearings, the MBC having a heat sink, and wherein the monitored temperature is a stator winding temperature, an EM bearing temperature, or a MBC temperature.

10. The method of claim 7, wherein the motor comprises a housing, a rotor positioned within a stator having stator windings, and lubricated bearings configured to support the rotor, and wherein the monitored temperature is a temperature of one or more of the lubricated bearings or of a lubricant of the lubricated bearings.

11. The method of claim 10, wherein the lubricated bearings comprise refrigerant-lubricated bearings, and wherein the monitored temperature is a temperature of the refrigerant used for lubricating the lubricated bearings.

12. A control system having processing circuitry and memory circuitry, the memory circuitry storing a temperature-based capacity control scheme for a chiller system and the processing circuitry being configured to perform the temperature-based capacity control scheme, wherein the temperature-based capacity control scheme is performed as a function of a monitored temperature in a motor configured to drive a compressor of the chiller system, a first temperature threshold corresponding to the monitored temperature, and a second temperature threshold corresponding to the monitored temperature higher than the first temperature threshold, wherein the temperature-based capacity control scheme comprises:
- a load limiting region corresponding to a temperature range between the first temperature threshold and the second temperature threshold, wherein the load limiting region is configured to proportionally limit loading of the chiller system based on an amount by which the monitored temperature has exceeded the first temperature threshold; or
- an override region associated with a temperature range above the second temperature threshold and below a chiller shutdown temperature, wherein the override region is configured to proportionally unload the chiller system based on an amount by which the monitored temperature has exceeded the second temperature threshold; or both.

13. The control system of claim 12, wherein the temperature-based capacity control scheme is performed in response to determining that the motor is being provided with a maximum allowed refrigerant flow from a condenser of the chiller system.

14. The control system of claim 13, wherein the temperature-based capacity control scheme is performed in response to determining that a motor cooling valve that controls the refrigerant flow to the motor is in a fully open position.

15. The control system of claim 12, wherein the temperature-based capacity control scheme comprises a no load command override associated with the second temperature threshold, wherein the no load command override does not allow a load command to be provided to components configured to allow loading of the chiller system.

* * * * *